United States Patent [19]

Breuer et al.

[11] Patent Number: 5,226,392
[45] Date of Patent: Jul. 13, 1993

[54] FUEL PRESSURE CONTROL VALVE FOR INTERNAL COMBUSTION ENGINES

[75] Inventors: Horst Breuer, Neuss; Heinz Beier, Meerbusch, both of Fed. Rep. of Germany

[73] Assignee: Pierburg GmbH, Neuss, Fed. Rep. of Germany

[21] Appl. No.: 951,173

[22] Filed: Sep. 24, 1992

[30] Foreign Application Priority Data

May 21, 1992 [DE] Fed. Rep. of Germany ....... 4216832

[51] Int. Cl.$^5$ ..................... F02M 39/00; F16K 31/12; F16F 1/18
[52] U.S. Cl. ................. 123/457; 137/505.37; 137/505.42; 267/158
[58] Field of Search ............... 123/457, 467, 506, 510; 137/505.34, 505.39, 505.41, 505.42, 901, 539, 505.37; 267/158, 159, 160, 161, 162, 163, 164, 165

[56] References Cited

U.S. PATENT DOCUMENTS

| | | | |
|---|---|---|---|
| Re. 13,699 | 3/1914 | Denis | 267/161 |
| 2,026,506 | 12/1935 | Binnall | 267/158 |
| 2,198,070 | 4/1940 | Wile | 137/505.37 |
| 2,236,206 | 3/1941 | Becker | 267/159 |
| 2,707,966 | 5/1955 | Taplin | 137/505.34 |
| 2,925,825 | 2/1960 | Streeter | 267/158 |
| 3,045,920 | 7/1962 | Hooker et al. | 267/158 |
| 3,259,383 | 7/1966 | Johnson et al. | 267/161 |
| 3,291,150 | 12/1966 | Ricker | 267/158 |
| 3,454,038 | 7/1969 | Katchka et al. | 267/159 |
| 3,545,471 | 12/1970 | Taplin | 137/505.34 |
| 3,978,880 | 9/1976 | Crown et al. | 137/505.39 |
| 4,489,751 | 12/1984 | Acomb et al. | 137/505.37 |
| 4,596,219 | 6/1986 | Kemmner | 123/457 |
| 4,625,847 | 12/1986 | Maucher | 267/158 |
| 4,660,597 | 4/1987 | Cowles | 137/505.42 |
| 4,667,069 | 5/1987 | Cholkeri | 267/159 |
| 5,111,793 | 5/1992 | Deeds | 123/457 |
| 5,113,831 | 5/1992 | Grant | 123/457 |

FOREIGN PATENT DOCUMENTS 4010173 3/1990 Fed. Rep. of Germany .

Primary Examiner—E. Rollins Cross
Assistant Examiner—Thomas Moulis
Attorney, Agent, or Firm—Ladas & Parry

[57] ABSTRACT

A pressure control valve having a valve body 2 consisting of metal material and a spring 10 determining the control pressure of the valve and designed as a flat pressure spring with radial arms, the spring being arranged in a chamber 20 of valve body 2 which is connected to the ambient atmosphere or to the inlet of the internal combustion engine. The flat pressure spring 10 is placed under tension between a deformable bead 12 of valve body 2 and a membrane cap 11 and the tension force of the spring is adjusted by deforming the bead 12.

8 Claims, 2 Drawing Sheet

FUEL PRESSURE CONTROL VALVE FOR INTERNAL COMBUSTION ENGINES

FIELD OF THE INVENTION

The invention relates to a fuel pressure control valve for an internal combustion engine. More particularly, the invention relates to a fuel pressure control valve having an adjustable control pressure obtained by varying the tension force of a biassing spring.

BACKGROUND AND PRIOR ART

A fuel pressure control valve is disclosed in DE-A1 40 10 173, which permits the use of plastic as a material for the housing of the valve. In contrast to known pressure control valves in which a cylindrical compression spring is arranged in a housing dome, the disclosed pressure control valve has a flat spring acting as a tension spring arranged in a fuel chamber. In order to adjust the control valve, a pipe connection forming a valve seat is screwed into the plastic housing, and the valve seat can be axially displaced by controlling the depth that the pipe connection is screwed into the housing.

Although this pressure control valve has a flat form, due to the use of the flat spring, for safety reasons, the use of plastic is viewed as unfavorable for the housing, since contact with fuel can change the properties of the plastic and the long-time behavior of the material can cause a loosening of the housing joint as well as the screw connection due to the fluctuating temperatures arising during engine operation.

SUMMARY OF THE INVENTION

The present invention thus has as an object a pressure control valve comprising a metal housing of a flat construction which enables economical mass production of the valve to be achieved.

This object is satisfied by a valve comprising a valve body of a deformable metal material, spring means for establishing a control pressure of the valve for fuel delivery, said spring means including a flat pressure spring arranged in a chamber provided in the valve body for selective connection to ambient atmosphere or to an inlet of the internal combustion engine, and a membrane in the valve body defining upper and lower chambers therein, the flat spring being in said upper chamber. The membrane carrying a valve closure assembly including a cap disposed in the upper chamber. The flat pressure spring is placed under tension in the upper chamber between a deformable bead of the valve body and the membrane cap, the tension of the spring being adjustable by deforming the bead of the valve body.

In further accordance with the invention, a pipe connection is loosely inserted in the valve body and is retained in axial secured position with respect to the valve body by engagement of a lip of a washer secured o the valve body with the pipe connection.

BRIEF DESCRIPTION OF THE FIGURES OF THE DRAWING

Embodiments of the invention are illustrated in the drawing and described hereafter.

DETAILED DESCRIPTION OF PREFERRED EMBODIMENTS

Figure 1:
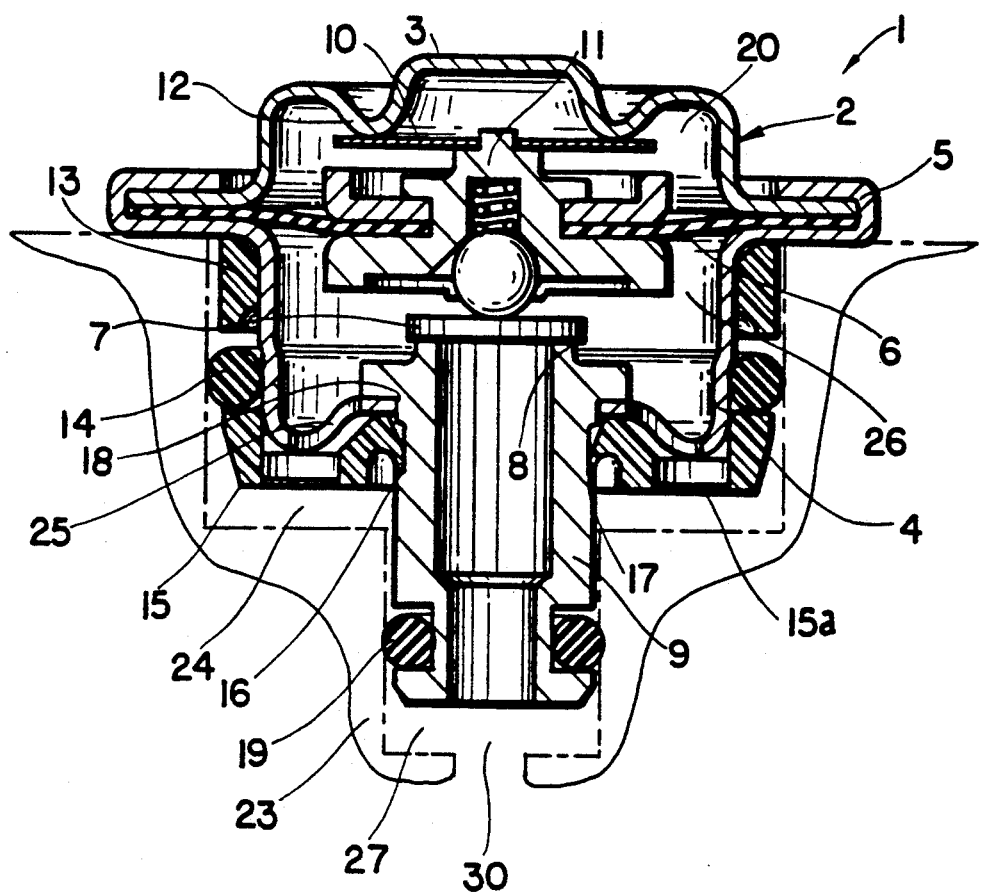
FIG. 1 is a sectional view of a fuel pressure control valve according to the invention.
Figure 2:
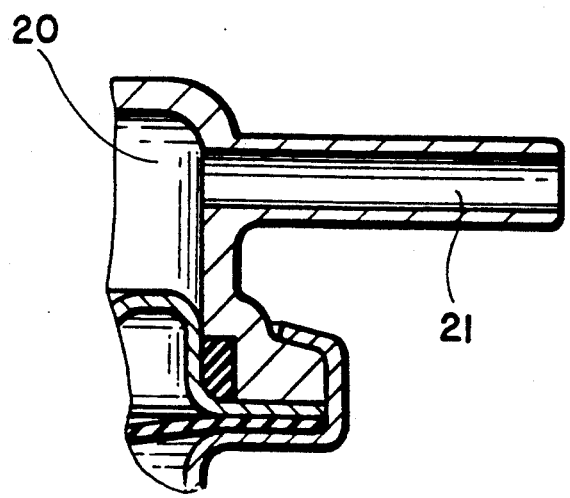
FIGS. 2 and 3 illustrate particular details of the valve in FIG. 1 and modifications thereof.

FIG. 1 shows a fuel pressure control valve 1 according to the invention, which comprises a valve body 2 having upper and lower halves 3, 4, respectively, which are secured together by rolling an edge portion of lower half 4 over the edge of upper half 3. A membrane 6 is securely fitted between the edges of the halves 3, 4. The valve body 2 is made of a metal material such as sheet steel. The membrane 6 supports a valve closing assembly 7, which cooperates with a valve seat 8 of a pipe connection 9. A flat pressure spring 10 is placed under tension between a membrane cap 11 of the valve closing assembly 7, and a bead region 12 of upper half 3 and the spring 10 applies a biassing force urging the valve closing assembly 7 against valve seat 8. A first plastic washer 13, an O-ring 14 and a second plastic washer 15 are placed around the lower body half 4. The second plastic washer 15 has an inner lip 16 which engages in a groove 17 in the pipe connection 9. The pipe connection 9 is loosely fitted in a bore 18 in lower body half 4. The engagement of the lip 16 in groove 17 secures the pipe connection 9 against axial displacement relative to the housing 2. The engagement of lip 16 in groove 17 is referred to as "clipping" the pipe connection in place. Openings are provided in the washer 15 between the outer part of the washer and lip 16 and these openings are covered by a filter 15a. Mounted on the lower end of pipe connection 9 is an O-ring seal 19.

A chamber 20 is formed in the valve body between membrane 6 and upper body half 3 and chamber 20 is selectively connected, through a tubular connector 21, to the inlet of the internal combustion engine or to ambient atmosphere in conventional manner.

Figure 3:
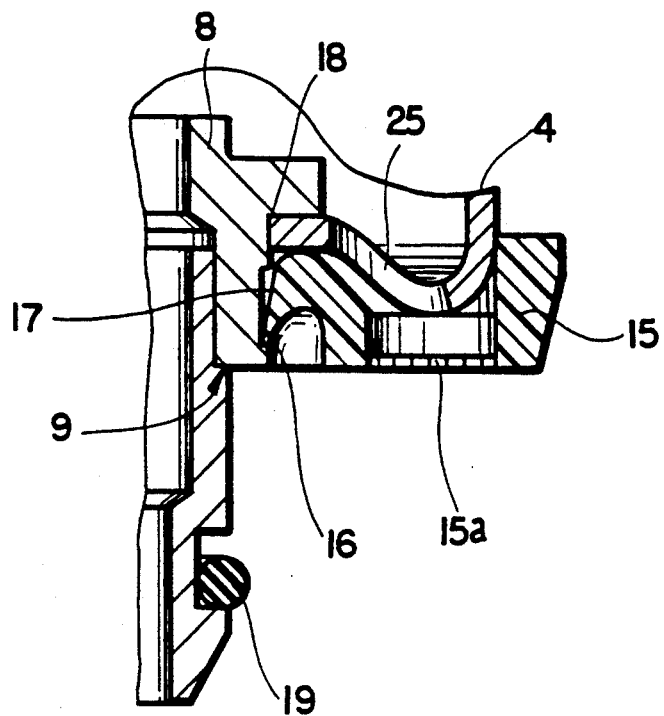

FIG. 3 shows, on an enlarged scale, the "clipping" of pipe connection 9, the latter being shown in a modified arrangement as comprised of two parts which are press-fit together.

Figure 4:
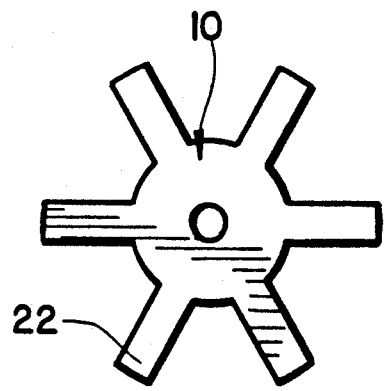
FIG. 4 is a plan view of a flat pressure spring.

FIG. 4 shows the flat pressure spring 10 with spring arms 22 arranged in the form of a star.

The fuel pressure control valve 1 of the invention is installed in a so-called fuel distributor region 23 of the internal combustion engine. The engine block is formed with a chamber 24, in which the valve body is inserted and joined with a fuel inlet (not shown).

The chamber 24 is tightly sealed against the atmosphere by O-ring 14 between the wall of chamber 24 and valve body 2 and the chamber 24 is connected, via openings 25 in the lower half 4 of the valve body, with a chamber 26 formed between the lower half 4 and membrane 6.

A second chamber 27 in distributor region 23 is tightly sealed with respect to chamber 24 by means of the pipe connection 9 projecting into the chamber 24 and the O-ring 19. The second chamber 27 is connected to a return connection 30 to the fuel tank.

The bead region 12 of upper body half 3 is formed as an annular bead which can be mechanically compressed to adjust the tension length of flat pressure spring 10, and thereby its tension force to adjust the fuel pressure to be controlled. The operation of the valve 1 is, in other respects, the same as conventional valves and requires no elaboration herein.

The pressure control valve of the invention is suitable for motor vehicle engines as it has a small structural height, and can be manufactured in a cost-favorable manner due to the simple adjustment of the control pressure. Namely, it is a simple matter to deform the bead 12 to adjust the tension of spring 10 as the center of the spring 10 is fixed to cap 11 and the ends of the arms 22 bear on the deformable bead 12.

Although the invention has been described in relation to preferred embodiments thereof, it will become apparent to those skilled in the art that numerous modifications and variations can be made within the scope and spirit of the invention as defined in the attached claims.

What is claimed is:

1. A fuel pressure control valve for an internal combustion engine which can be sealingly inserted into a chamber provided with a fuel inlet in a fuel distributor region of an engine body, said valve comprising:
   a valve body of a metal material;
   a spring means for establishing a control pressure for fuel delivery including a flat pressure spring, and
   a membrane in said valve body defining in said valve body upper and lower chambers, a membrane cap mounted on said membrane and disposed in said upper chamber,
   said flat pressure spring being placed under tension in said upper chamber between a deformable bead of said valve body and said membrane cap, the tension of said spring being adjustable by deforming said bead.

2. A pressure control valve according to claim 1, further comprising an O-ring on said valve body, two plastic washers on said valve body holding said O-ring in place, one of said washers having a lip, a pipe connection inserted loosely into the valve body, said lip engaging said pipe connection to axially secure the same in said valve body.

3. A pressure control valve according to claim 2, wherein said flat pressure spring includes a central region and a plurality of arms extending radially from said central region.

4. A pressure control valve according to claim 3, wherein said central region of said flat pressure spring is secured to said membrane cap, said arms bearing against said bead.

5. A pressure control valve according to claim 4, wherein said bead extends inwardly into said upper chamber.

6. A pressure control valve according to claim 5, comprising a valve closing assembly mounted on said membrane and including said membrane cap.

7. A pressure control valve according to claim 6, wherein said pipe connection includes a valve seat cooperating with said valve closing assembly to selectively open and close the pipe connection.

8. A pressure control valve according to claim 1, wherein said upper chamber includes means for selective connection to ambient atmosphere or to an inlet of the internal combustion engine.

* * * * *